(12) United States Patent
Kawai

(10) Patent No.: US 10,295,886 B2
(45) Date of Patent: May 21, 2019

(54) SHUTTER UNIT, IMAGING APPARATUS PROVIDED WITH SHUTTER UNIT

(71) Applicant: Panasonic Intellectual Property Management Co., Ltd., Osaka (JP)

(72) Inventor: Yasutoshi Kawai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 4 days.

(21) Appl. No.: 15/586,700

(22) Filed: May 4, 2017

(65) Prior Publication Data

US 2017/0329203 A1 Nov. 16, 2017

(30) Foreign Application Priority Data

May 16, 2016 (JP) ................................. 2016-097906

(51) Int. Cl.
*G03B 9/16* (2006.01)
*G03B 17/14* (2006.01)
*G03B 9/42* (2006.01)

(52) U.S. Cl.
CPC ................ *G03B 9/16* (2013.01); *G03B 9/42* (2013.01); *G03B 17/14* (2013.01)

(58) Field of Classification Search
CPC . G03B 9/16; G03B 9/42; G03B 17/14; H04N 5/2353; H04N 5/238; F16B 43/003
USPC ........................................ 396/480, 483, 485
See application file for complete search history.

(56) References Cited

U.S. PATENT DOCUMENTS

| 4,186,488 A | * | 2/1980 | Wallshein | ................ | A61C 7/14 |
| | | | | | 433/8 |
| 7,182,529 B2 | * | 2/2007 | Kurosawa | .............. | G03B 19/12 |
| | | | | | 348/374 |
| 7,532,247 B2 | * | 5/2009 | Kamoda | .............. | H04N 5/2253 |
| | | | | | 348/373 |
| 8,746,995 B2 | * | 6/2014 | Okutani | .................... | G03B 9/42 |
| | | | | | 396/466 |

(Continued)

FOREIGN PATENT DOCUMENTS

| JP | 58-137636 A | 8/1983 |
| JP | 07-041534 U | 7/1995 |

(Continued)

*Primary Examiner* — Clayton E. LaBalle
*Assistant Examiner* — Linda B Smith
(74) *Attorney, Agent, or Firm* — Renner Otto Boisselle & Sklar, LLP

(57) ABSTRACT

An imaging apparatus includes a shutter for controlling object light incident to an image sensor, a holding frame holding the shutter, an annular elastic member for absorbing impact generated when the shutter is driven, a first fastening member engaging with an inner circumferential surface of the annular elastic member, a first body-side support provided to a body of the imaging apparatus, and a first holding-frame-side support provided to the holding frame. On either of the first body-side support and the first holding-frame-side support, a through hole is formed, into which the annular elastic member is press-fitted. A length of an inner circumference of the through hole is greater than a length of an outer circumference of the annular elastic member when the through hole is seen from a direction to which the first fastening member is fastened. Another of the body-side support and the first holding-frame-side support is fastened with the first fastening member.

6 Claims, 9 Drawing Sheets

(56) References Cited

U.S. PATENT DOCUMENTS

| | | | |
|---|---|---|---|
| 9,036,988 B1* | 5/2015 | Ryu | H04N 5/2353 396/235 |
| 2012/0182469 A1 | 7/2012 | Shintani | |
| 2015/0300642 A1* | 10/2015 | Okuma | F23Q 7/001 219/526 |
| 2016/0138630 A1* | 5/2016 | Aikawa | F16B 5/0642 137/343 |
| 2016/0217943 A1* | 7/2016 | Kim | H01H 13/86 |
| 2016/0333917 A1* | 11/2016 | Aikawa | F16B 5/0642 |

FOREIGN PATENT DOCUMENTS

| | | |
|---|---|---|
| JP | 10-274189 A | 10/1998 |
| JP | 2008-177675 A | 7/2008 |
| JP | 2012-163947 A | 8/2012 |

* cited by examiner 610a  192a 610a  192a 610a  192a 610a  192a
SIZE R

SHUTTER UNIT, IMAGING APPARATUS PROVIDED WITH SHUTTER UNIT

BACKGROUND

1. Technical Field

The present disclosure relates to a shutter unit and an imaging apparatus provided with the shutter unit, which are used for a digital still camera or the like for mainly capturing still pictures.

2. Description of Related Art

Unexamined Japanese Patent Publication No. 2012-163947 discloses a camera body in which a shutter unit is fixed to a chassis. In the camera body, the shutter unit is fastened with two screw members from a front side of the chassis, and fixed to the chassis.

SUMMARY

An imaging apparatus according to the present disclosure includes a shutter for controlling object light incident to an image sensor for capturing an optical image of an object to generate image data, a holding frame holding the shutter, an annular elastic member for absorbing impact generated when the shutter is driven, a first fastening member engaging with an inner circumferential surface of the annular elastic member, a first body-side support provided to a body of the imaging apparatus, and a first holding-frame-side support provided to the holding frame. On either of the first body-side support and the first holding-frame-side support, a through hole is formed, into which the annular elastic member is press-fitted. A length of an inner circumference of the through hole is greater than a length of an outer circumference of the annular elastic member when the through hole is seen from a direction to which the first fastening member is fastened, Another of the body-side support and the first holding-frame-side support is fastened with the first fastening member.

DETAILED DESCRIPTION

Selected exemplary embodiments will be described below in detail with reference to the drawings as required. However, detailed descriptions more than necessary might be omitted. For example, detailed descriptions of well-known items and duplicated descriptions of substantially identical components might be omitted. Such omissions would prevent descriptions provided below from becoming redundant more than necessary, but help those skilled in the art easily understand the descriptions.

It will be apparent to those skilled in the art from this disclosure that the following descriptions and the accompanied drawings of the present disclosure are provided for illustration only and not for the purpose of limiting the scope of the present disclosure as defined by the appended claims and their equivalents.

First Exemplary Embodiment

A first exemplary embodiment will be described below with reference to FIGS. 1 to 6C.

1-1. Configuration 1-1-1. Overview of Imaging Apparatus

Figure 1:
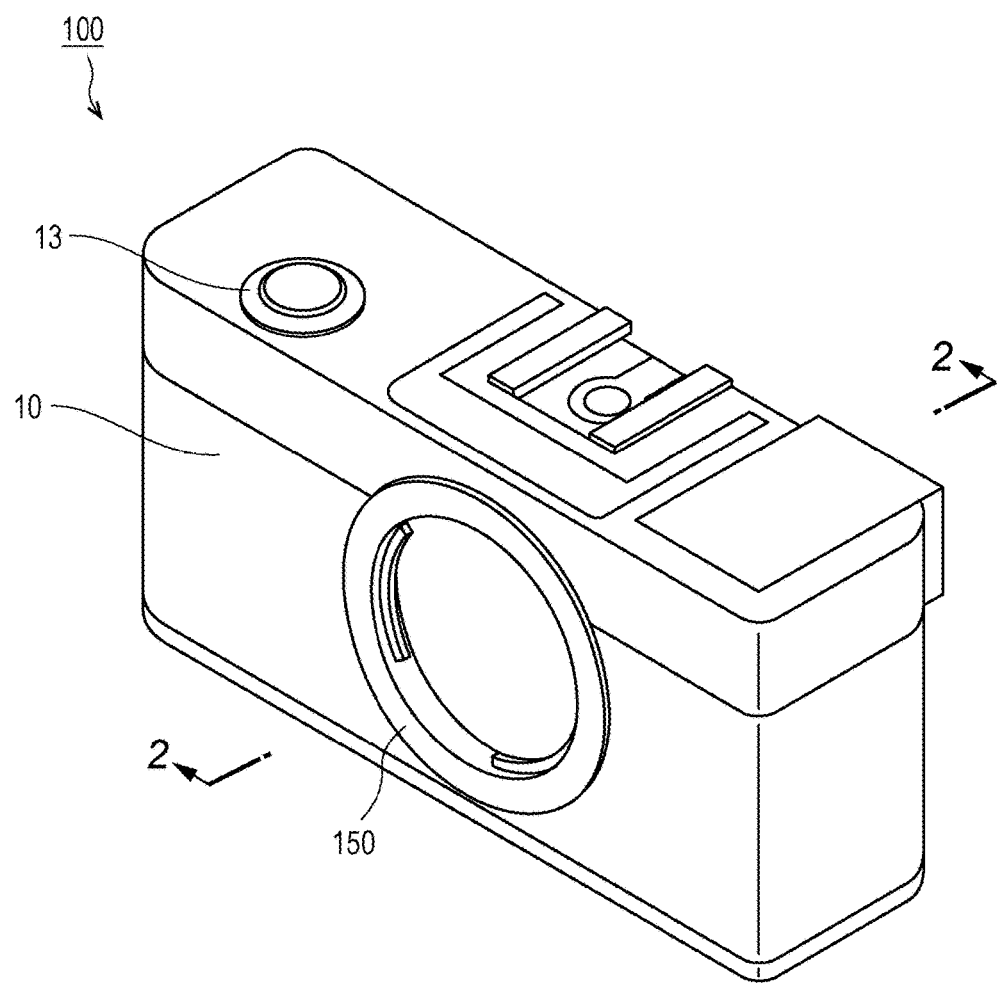
FIG. 1 is an oblique view of a camera body according to a first exemplary embodiment.

FIG. 1 is an oblique view of camera body 100 according to a first exemplary embodiment. Camera body 100 is a digital camera body with interchangeable lenses, and includes housing 10, shutter button 13, and body mount 150 to which a lens unit (an example of an interchangeable lens) can be detachably attached.

Various components will be described in detail below. For purposes of this description, an object side of camera body 100 will be referred to as "front," an imaging plane side as "back" or "rear," a vertically upper side in a normal orientation of camera body 100 as "upper," and a vertically lower side as "lower." Terms "left and "right" refer to when camera body 100 is viewed from an object.

1-1-2. Configuration of Camera Body 100

Figure 2:
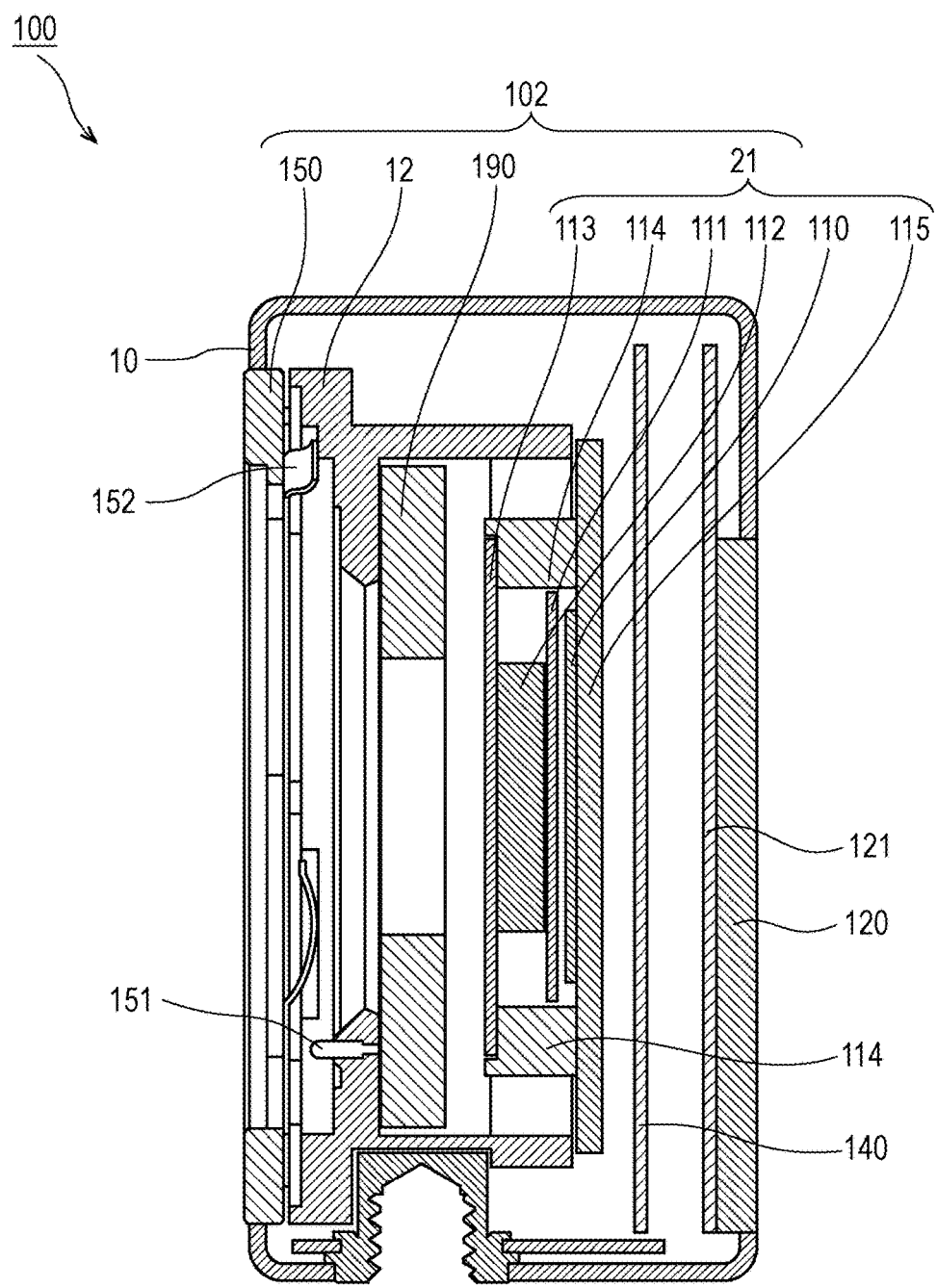
FIG. 2 is a central cross-sectional view of the camera body according to the first exemplary embodiment.

A configuration of an imaging apparatus (camera) according to the first exemplary embodiment will be described with reference to FIG. 2. FIG. 2 shows a central, vertical cross section of camera body 100, and particularly shows a cross section taken along line 2-2 of FIG. 1.

Main components of camera body 100 are body mount 150, focal plane shutter unit (hereinafter abbreviated as "shutter unit") 190, diaphragm 113, optical low-pass filter 112, cover glass 111, Complementary Metal Oxide Semiconductor (CMOS) image sensor 110, heat diffusing plate 115, main circuit board 140, reinforcing plate 121, and display device 120, which are disposed inside housing 10 in order starting from front.

CMOS image sensor 110 is an example of an image sensor that captures an optical image of an object and converts the captured image into an electrical image signal. A concept of "image sensor" encompasses a Charge Coupled Device (CCD) image sensor, etc.

Main circuit board 140 includes a circuit board that controls and drives CMOS image sensor 110. Main circuit board 140 also includes another circuit board that performs predetermined processing on image data sent from CMOS image sensor 110, and controls and drives CMOS image sensor 110. Main circuit board 140 is an example of an image sensor circuit board that performs predetermined processing, such as A/D conversion (analog-digital conversion), on image data sent from CMOS image sensor 110.

Display device 120 displays an image, etc., indicating the display-use image data. The display-use image data is image data that has undergone image processing by main circuit board 140, data for displaying, as images, imaging conditions, operation menus, and so forth of camera body 100, and the like. Display device 120 is able to selectively display both moving and still pictures.

Display device 120 is provided to camera body 100. In this exemplary embodiment, display device 120 is disposed on a rear face of housing 10, but display device 120 may be disposed anywhere on camera body 100. Display device 120 is also an example of a display part provided to camera body 100. Examples of other display parts that can be used include organic Electro-Luminescence (EL) devices, inorganic EL devices, plasma display panels, liquid crystal panels, and other such devices that can display images.

Body mount 150 holds an interchangeable lens unit by bayonet coupling. Body mount 150 can be mechanically connected to a lens mount of the lens unit via mount spring 152, and can be electrically connected to the lens mount of the lens unit by electrical contact 151. At least either of data and a control signal can be sent/received between camera body 100 and the lens unit via body mount 150 and the lens mount.

Shutter unit 190 is disposed between body mount 150 and CMOS image sensor 110 to drive a shutter necessary for exposure.

Optical low-pass filter 112 eliminates a high-frequency component of object light. Specifically, optical low-pass filter 112 separates an object image formed by the lens unit so that a resolution will be grainier than a pitch of pixels in CMOS image sensor 110. In general, an image sensor such as a CMOS image sensor has a color filter for RGB colors (Red, Green, Blue) called a Bayer array for each pixel and/or a complementary color filter for YCM colors (Yellow, Cyan, Magenta). Therefore, if there resolution drops to one pixel, not only will a false color be generated, but if an object is a repeating pattern a very bad moiré phenomenon will occur, so it is preferable that optical low-pass filter 112 is used to suppress occurrence of a false color and moiré phenomena. Optical low-pass filter 112 also has an Ir cut filter function for cutting out infrared light.

Diaphragm 113 is disposed further to a front than CMOS image sensor 110, and prevents dust from adhering to CMOS image sensor 110. Vibrations also knock off any dust adhering to diaphragm 113 itself. Specifically, diaphragm 113 is a transparent, thin, plate-like member, is affixed in a plane of optical low-pass filter 112, and is fixed to optical element holding member 114 via a piezoelectric element. Diaphragm 113 vibrates along with vibrations of the piezoelectric element produced when an AC voltage is applied. An anti-fogging layer made from titanium oxide or another such transparent photo-catalyst is formed on a front face of diaphragm 113.

Optical element holding member 114 holds optical members belonging to CMOS image sensor 110, and serves to make the optical members into a single unit. The optical members include diaphragm 113, optical low-pass filter 112, cover glass 111, CMOS image sensor 110, and heat diffusing plate 115, in order starting from front. In this exemplary embodiment, optical element holding member 114 and the optical members configure CMOS image sensor unit 21.

Chassis 12 supports body mount 150, shutter unit 190, and CMOS image sensor unit 21. Body mount 150, shutter unit 190, and CMOS image sensor unit 21 are screwed to chassis 12. In this exemplary embodiment, chassis 12, body mount 150, shutter unit 190, and CMOS image sensor unit 21 configure mount unit 102.

1-1-3. Outline of Holding Mechanism of Shutter Unit 190

A holding mechanism of shutter unit 190 will be described with reference to FIGS. 3, and 4.

Figure 3:
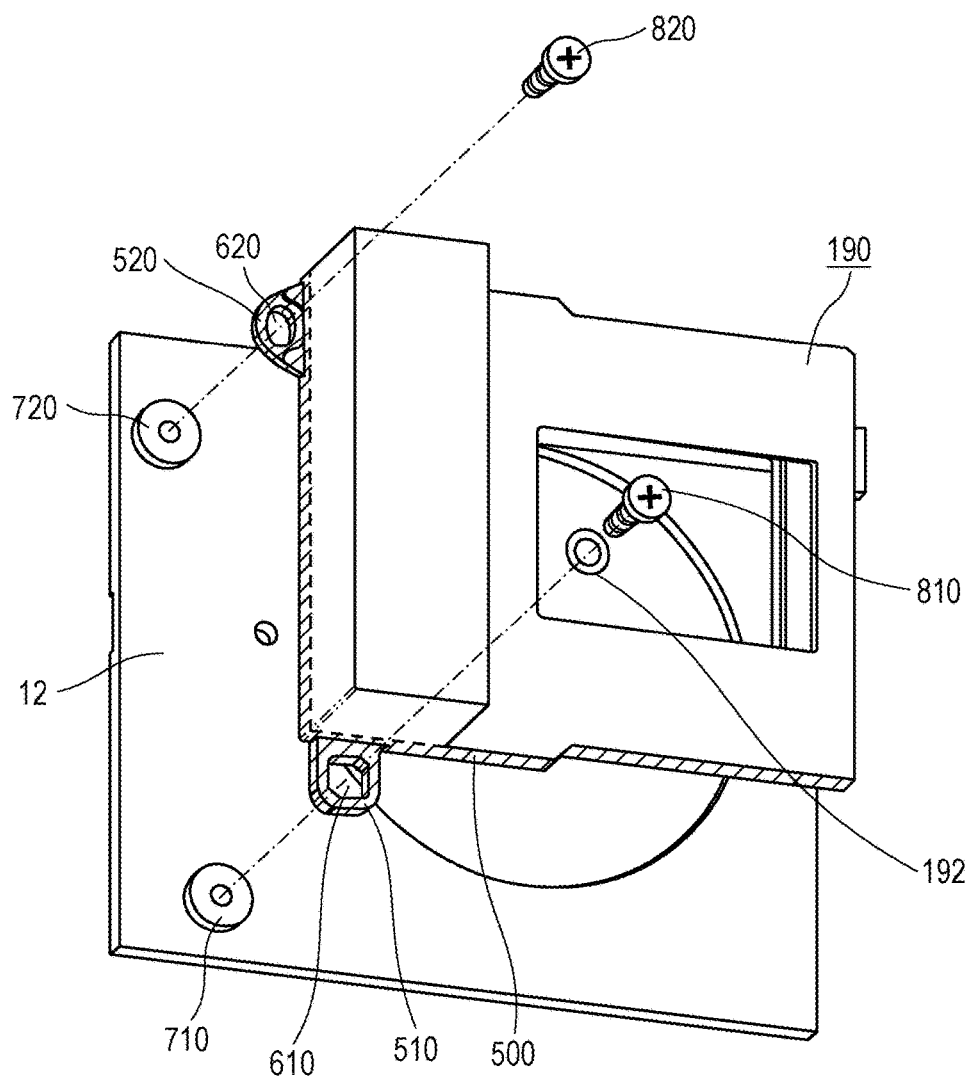
FIG. 3 is an oblique exploded view illustrating a holding mechanism of a shutter unit according to the first exemplary embodiment.

FIG. 3 is an oblique exploded view illustrating the holding mechanism of shutter unit 190 according to the first exemplary embodiment. FIG. 4 is a view of the holding mechanism of shutter unit 190, when viewed from rear. In FIGS. 3, and 4, shutter unit 190 is viewed from rear.

Shutter unit 190 includes front curtain 501a, rear curtain 501b, front curtain drive member 502a for driving front curtain 501a, rear curtain drive member 502b for driving rear curtain 501b, and holding frame 500. In this exemplary embodiment, front curtain 501a and rear curtain 501b configure a shutter curtain. As shown in FIG. 4, a shutter blade drive mechanism rotates front curtain drive member 502a in direction Fa, and rotates rear curtain drive member 502b in direction Fb, to vertically drive the shutter curtain. Specifically, when a shutter speed is lower than a certain speed, after front curtain 501a is fully opened, rear curtain 501b moves downward. When a shutter speed is higher than the certain speed, after a predetermined interval, front curtain 501a and rear curtain 501b simultaneously move downward. Shutter unit 190 therefore controls an amount of object light incident to CMOS image sensor 110.

With oblique lines as shown in FIG. 3, holding frame 500 holds members configuring shutter unit 190. Holding frame 500 is formed with holding-frame-side supports (first holding-frame-side support 510 and second holding-frame-side support 520).

First holding-frame-side support 510 is formed with through hole 610 through which first fastening member 810 passes. Second holding-frame-side support 520 is formed with long hole 620 through which second fastening member 820 passes. Fastening members (first fastening member 810 and second fastening member 820) may be, for example, but not limited to, screws and the like that can be used for fastening.

On chassis 12 fixed to imaging apparatus body 100, body-side supports (first body-side support 710 and second body-side support 720) are formed.

The body-side supports are, for example, screw grooves and the like formed protruded rearward from a rear face of chassis 12. A cross-sectional shape of each of the body-side supports in a vertical direction is a circular shape. In this exemplary embodiment, the body-side supports are formed protruded. However, the body-side supports may be configured in any form as long as fastening can be performed.

Annular elastic member 192 is an elastic member having an annular shape that opens internally, and is, for example, a rubber O-ring.

With the fastening members (first fastening member 810 and second fastening member 820) and annular elastic member 192, shutter unit 190 is attached from rear, via the supports (first holding-frame-side support 510 and second holding-frame-side support 520) of holding frame 500, to the supports (first body-side support 710 and second body-side support 720) of chassis 12.

1-1-4. Details of Supports

The supports according to the first exemplary embodiment will be described with reference to FIGS. 3 to 6C.

Figure 4:
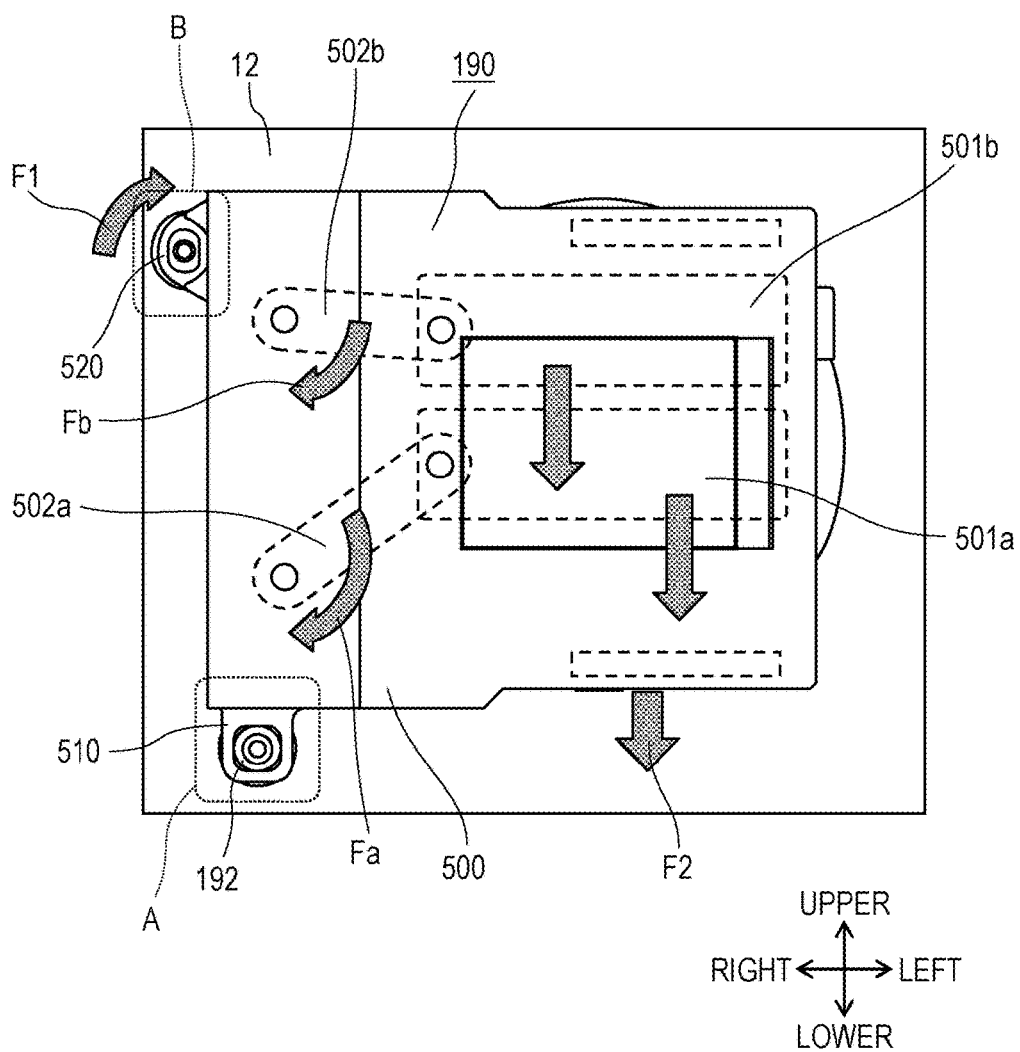
FIG. 4 is a view of the holding mechanism of the shutter unit according to the first exemplary embodiment, when viewed from rear.
Figure 5A:
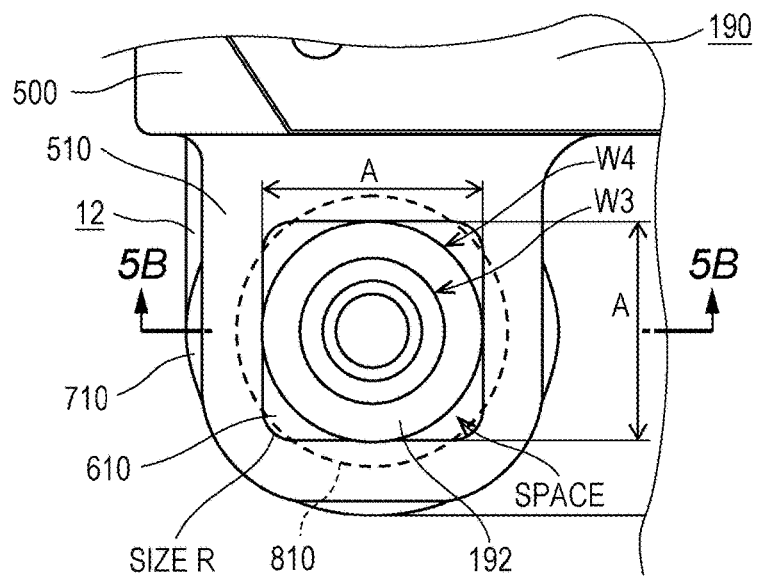
FIG. 5A is an enlarged view of a first holding-frame-side support and a first body-side support according to the first exemplary embodiment, when viewed from rear.
Figure 5B:
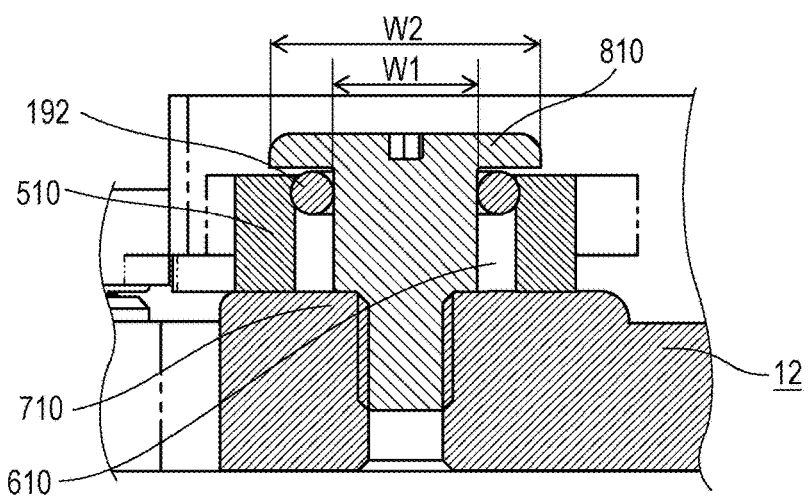
FIG. 5B shows a cross section taken along line 5B-5B of FIG. 5A.
Figure 5C:
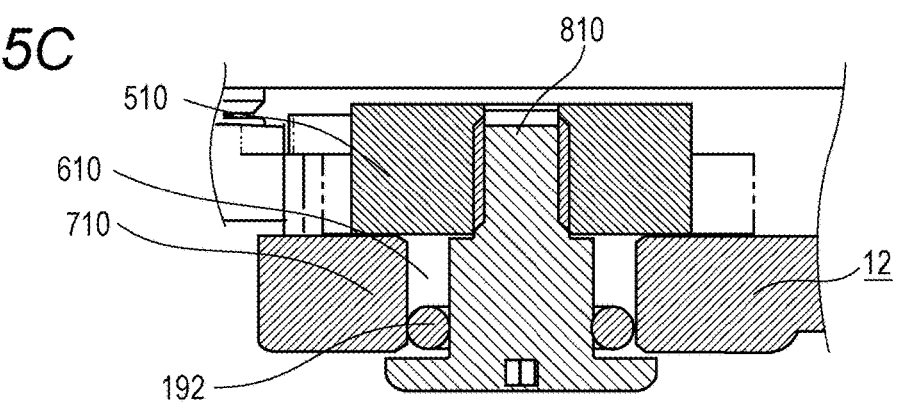
FIG. 5C shows a cross section of a first holding-frame-side support and a first body-side support according to an exemplary modification.
Figure 6A:
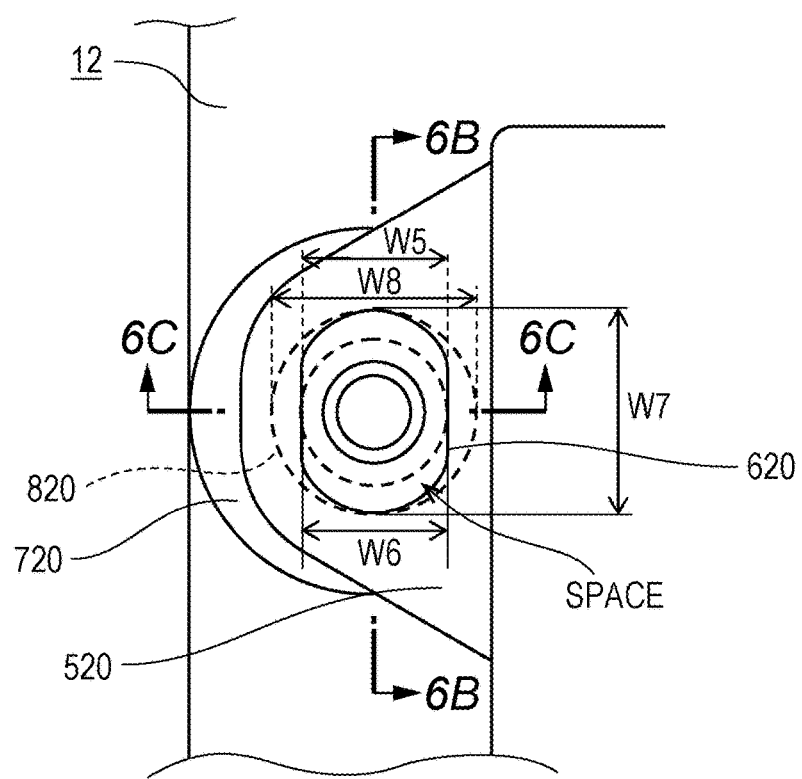
FIG. 6A is an enlarged view of a second holding-frame-side support and a second body-side support according to the first exemplary embodiment, when viewed from rear.
Figure 6B:
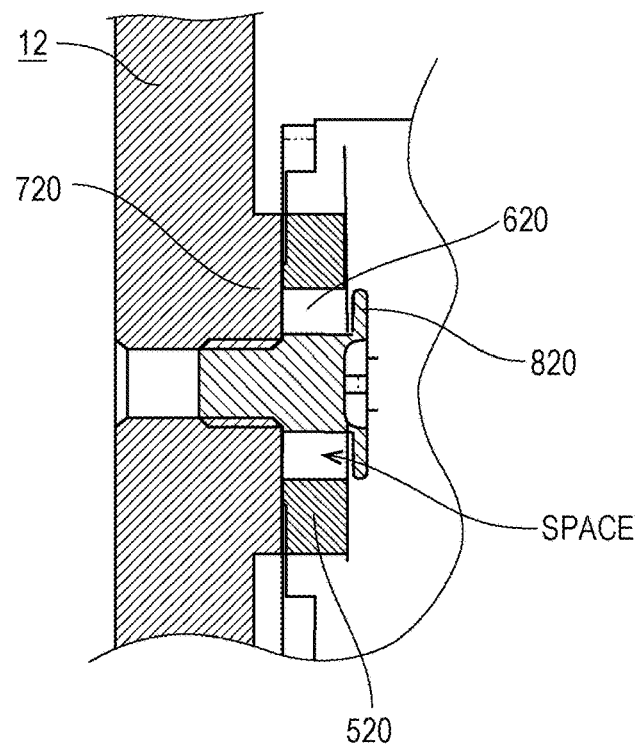
FIG. 6B shows a cross section taken along line 6B-6B of FIG. 6A.
Figure 6C:
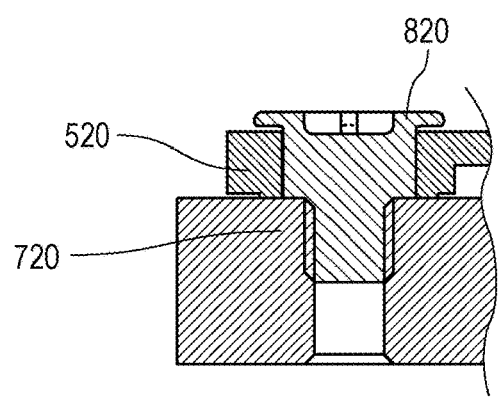
FIG. 6C shows a cross section taken along line 6C-6C of FIG. 6A.

FIG. 5A is an enlarged view of the first holding-frame-side support and the first body-side support, when viewed from rear, and illustrates in detail an area enclosed with dotted line A in FIG. 4. FIG. 5B shows a cross section taken along line 5B-5B of FIG. 5A. FIG. 5C shows a cross section of a first holding-frame-side support and a first body-side support according to an exemplary modification. FIG. 6A is an enlarged view of the second holding-frame-side support and the second body-side support when viewed from rear, and illustrates in detail an area enclosed by dotted line B in FIG. 4. FIG. 6B shows a cross section taken along line 6B-6B of FIG. 6A. FIG. 6C shows a cross section taken along line 6C-6C of FIG. 6A. Hereinbelow, an outer diameter means a diameter on an outer side, while an inner diameter means a diameter on an inner side.

As shown in FIGS. 5A and 5B, with annular elastic member 192 press-fitted to first holding-frame-side support 510 of holding frame 500, shutter unit 190 is attached from rear with first fastening member 810 to first body-side support 710 of chassis 12.

First body-side support 710 of chassis 12 is formed with the screw groove to be fastened with first fastening member 810.

A tip of first fastening member 810 is provided with a screw thread to be screwed into first body-side support 710. Outer diameter W1 below a neck of first fastening member 810 is slightly greater than inner diameter W3 of annular elastic member 192. An inner circumferential surface of annular elastic member 192 presses an outer circumferential surface below the neck of first fastening member 810 so that annular elastic member 192 is fixed. Outer diameter W2 of the head of first fastening member 810 is greater than rectangular hole size A of through hole 610 to prevent shutter unit 190 from dropping.

Outer diameter W4 of annular elastic member 192 is slightly greater than rectangular hole size A of through hole 610. At an area where an outer circumferential surface of annular elastic member 192 and an inner circumferential surface of through hole 610 come into contact with each other, the outer circumferential surface of annular elastic member 192 presses the inner circumferential surface of through hole 610.

Through hole 610 has an approximately rectangular shape with four round corners. The four corners of through hole 610 each have a space (allowance) into which annular elastic member 192 can be elastic-deformed. While no impact force (F1 or F2) described later is generated, the allowance is formed surrounded by the outer circumferential surface of annular elastic member 192 and the inner circumferential surface of through hole 610, areas of which do not come into contact with each other. Size R of each of the four corners of through hole 610 is smaller than a radius forming the outer diameter of annular elastic member 192.

Supporting of first holding-frame-side support 510 will be described in further detail herein.

To prevent shutter unit 190 from dropping from chassis 12, first fastening member 810 presses with its head a rear face of first holding-frame-side support 510 to directly fasten first holding-frame-side support 510 to first body-side support 710. At this time, a part of the head of first fastening member 810 and a part of the rear face of first holding-frame-side support 510 may not always come into contact with each other. However, for example, impact generated when shutter unit 190 is driven could cause the part of the head of first fastening member 810 and the part of the rear face of first holding-frame-side support 510 to come into contact with each other. On the other hand, an inner circumferential surface of first holding-frame-side support 510 does not always come into contact with first fastening member 810, and thus first holding-frame-side support 510 is not directly fastened by first fastening member 810. That is, shutter unit 190 is attached to chassis 12 by fastening first fastening member 810 into first body-side support 710 with annular elastic member 192 press-fitted to through hole 610 so that annular elastic member 192 is deformed by four surfaces of the inner circumferential surface of through hole 610. Therefore, when no external force is generated in shutter unit 190, first holding-frame-side support 510 can stably hold shutter unit 190 to chassis 12 at a position at which an elastic force due to deformed annular elastic member 192 balances (around an axial center of first fastening member 810), while, when an external force is generated in shutter unit 190, first holding-frame-side support 510 can movably support shutter unit 190 to chassis 12 on a surface perpendicular to an optical axis. Even after an external force is generated in shutter unit 190, due to the elastic force (restoring force) of annular elastic member 192, shutter unit 190 is able to return to a position at which the elastic force balances, and thus shutter unit 190 can stably be held.

As shown in FIGS. 6A to 6C, shutter unit 190 is attached from rear with second fastening member 820, via second holding-frame-side support 520 of holding frame 500, to second body-side support 720 of chassis 12.

Second body-side support 720 of chassis 12 is formed with the screw groove to be fastened with second fastening member 820.

A tip of second fastening member 820 is provided with a screw thread to be screwed into second body-side support 720. Outer diameter W5 below a neck of second fastening member 820 is approximately identical to inner diameter W6 of long hole 620 in a shorter-side direction (lateral direction).

Holding frame 500 of shutter unit 190 is formed with second holding-frame-side support 520. Second holding-frame-side support 520 is formed with long hole 620.

Inner diameter W7 of long hole 620 in a longer-side direction (longitudinal direction) is greater than outer diameter W5 below the neck of second fastening member 820 to create spaces with second fastening member 820. A total length of the spaces formed in the longitudinal direction is longer than a difference between rectangular hole size A of through hole 610 and outer diameter W3 below the neck of first fastening member 810.

As described above, shutter unit 190 is attached to chassis 12 so that a movement in a lateral direction is restricted, but shutter unit 190 is slidable within long hole 620 in a direction toward which the shutter curtain is driven (longitudinal direction).

Supporting of second holding-frame-side support 520 will now be described in further detail herein.

To prevent shutter unit 190 from dropping from chassis 12, second fastening member 820 presses with its head a rear face of second holding-frame-side support 520 to directly fastens second holding-frame-side support 520 to second body-side support 720. At this time, a part of the head of second fastening member 820 and a part of the rear face of second holding-frame-side support 520 may not always come into contact with each other. However, for example, impact generated when shutter unit 190 is driven could cause the part of the head of second fastening member 820 and the part of the rear face of second holding-frame-side support 520 to come into contact with each other. On the other hand, an inner circumferential surface of second holding-frame-side support 520 does not always come into contact with second fastening member 820, and thus second holding-frame-side support 520 is not directly fastened by second fastening member 820. That is, shutter unit 190 is attached to chassis 12 with second fastening member 820 fastened to second body-side support 720 with gaps created between the inner circumferential surface of second holding-frame-side support 520 and an outer circumferential surface of second fastening member 820. Therefore, second holding-frame-side support 520 can slidably support shutter unit 190 to chassis 12.

1-2. Operation

An operation of the imaging apparatus configured as described above will be described below.

A user holds camera body 100 and presses shutter button 13 to capture an object. Front curtain 501a and rear curtain 501b are then driven in a longitudinal direction with a slit width that is predetermined in accordance with a set shutter speed is kept maintained to capture the object.

Upon the shutter curtain is driven, as shown in FIG. 4, a rotational moment (Fa or Fb) is applied to a rotation pivot axis of front curtain drive member 502a or rear curtain drive member 502b, and then, as its reactive force, an impact force (F1) is applied so as to rotate shutter unit 190. Since long hole 620 restricts a movement in a lateral direction, in shutter unit 190, a rotational force is generated around an axis of second fastening member 820.

Since through hole 610 is press-fitted with annular elastic member 192, due to the rotational force, annular elastic member 192 is compressed and deformed. The rotational force is therefore absorbed, and thus shutter unit 190 is prevented from rotating.

Since the shutter curtain is restricted for its movable range by a restriction member, after the shutter curtain is driven, the shutter curtain and the restriction member come into contact with each other, and thus a greater impact force (F2) is applied to shutter unit 190. Since long hole 620 restricts a movement in a lateral direction, the impact force (F2) is mainly applied in the longitudinal direction (directions toward which the shutter opens and closes), and acts on shutter unit 190.

Since through hole 610 is press-fitted with annular elastic member 192, due to the impact force, annular elastic member 192 is compressed and deformed.

The impact force is therefore absorbed, and thus shutter unit 190 is prevented from moving.

At a lowermost portion at which through hole 610 comes into pressure contact with the outer circumferential surface of annular elastic member 192, to which an impact force is fully applied, annular elastic member 192 is further compressed and deformed than another area of the portion. Annular elastic member 192 is deformed with its volume kept to an extent that an elastic force is kept maintained, and escapes and enters into the spaces of through hole 610.

1-3. Effects and Other Results

As described above, in this exemplary embodiment, the imaging apparatus includes a shutter (front curtain 501a or rear curtain 501b) for controlling object light incident to image sensor 110 for capturing an optical image of an object to generate image data, holding frame 500 holding the shutter, annular elastic member 192 for absorbing impact generated when the shutter is driven, first fastening member 810 engaging with an inner circumferential surface of annular elastic member 192, first body-side support 710 provided to a body of the imaging apparatus, and first holding-frame-side support 510 provided to holding frame 500.

On either of first body-side support 710 and first holding-frame-side support 510, through hole 610 is formed, into which annular elastic member 192 is press-fitted. Through hole 610 has spaces into which, when impact is generated, and annular elastic member 192 is compressed and deformed, annular elastic member 192 enters. Another of first body-side support 710 and first holding-frame-side support 510 is fastened with first fastening member 810.

While the shutter is not driven, annular elastic member 192 therefore presses first holding-frame-side support 510. When the shutter is driven, and impact is generated, annular elastic member 192 is deformed with its volume kept to an extent that an elastic force is kept maintained to press first holding-frame-side support 510.

While unevenness in shape of annular elastic member 192 or first holding-frame-side support 510 is absorbed, and shutter unit 190 is held to chassis 12, and even when the shutter is driven, and impact is generated, holding frame 500 of shutter unit 190 can be stably held to imaging apparatus body 100 with an elastic force of annular elastic member 192 kept maintained.

In this exemplary embodiment, the imaging apparatus further includes second fastening member 820 for fastening holding frame 500 to imaging apparatus body 100, second body-side support 720 provided to imaging apparatus body 100 and fastened by second fastening member 820, and second holding-frame-side support 520 provided to holding frame 500 and fastened by second fastening member 820.

Second body-side support 720 is fastened with second fastening member 820 so that holding frame 500 provided with long hole 620 having spaces in directions toward which impact acts (directions toward which the shutter opens and closes) is slidable within long hole 620 in the directions toward which shutter opens and closes.

Therefore, holding frame 500 slides along long hole 620, and an impact force is restricted in directions toward which the shutter opens and closes. Holding frame 500 of shutter unit 190 can accordingly be further stably held to imaging apparatus body 100.

In this exemplary embodiment, the imaging apparatus further includes body mount 150 for detachably holding a lens unit having an optical system for generating an optical image of an object.

The present disclosure is therefore applicable to imaging apparatuses with an interchangeable lens unit.

In this exemplary embodiment, through hole 610 of the imaging apparatus has an approximately rectangular shape where through hole 610 comes into pressure contact in each part of four sides with the outer circumferential surface of annular elastic member 192 to have spaces in which, when impact is generated, annular elastic member 192 can be compressed and deformed into the four corners of through hole 610.

Annular elastic member 192 is therefore deformed with its volume kept to an extent that an elastic force is kept maintained to press first holding-frame-side support 510 in longitudinal and lateral directions. Holding frame 500 of shutter unit 190 can therefore be stably held to imaging apparatus body 100 in longitudinal and lateral directions.

In this exemplary embodiment, through hole 610 of the imaging apparatus has the approximately rectangular shape where, at each of the four corners of through hole 610, size R that is smaller than a half of outer diameter W3 of annular elastic member 192 is formed.

Therefore, while the spaces can be kept maintained, pressure applied to the four corners of through hole 610 can be dispersed. Damage due to impact when the shutter is driven or camera body 100 is dropped can therefore be prevented.

Exemplary Modifications of Through Hole 610

Exemplary modifications of through hole 610 according to the first exemplary embodiment will be described below with reference to FIGS. 7A to 7D.

In FIGS. 7A to 7D, external form 192a shows a cross-sectional shape of annular elastic member 192 in a longitudinal direction in FIG. 4. Internal form 610a shows a cross-sectional shape of through hole 610 in the longitudinal direction in FIG. 4.

Figure 7A:
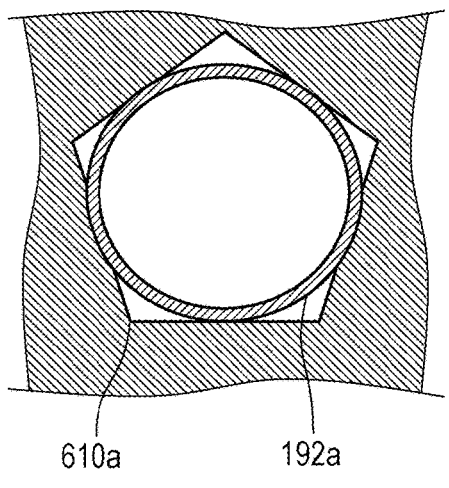
FIG. 7A shows a cross section of a through hole according to an exemplary modification.
Figure 7B:
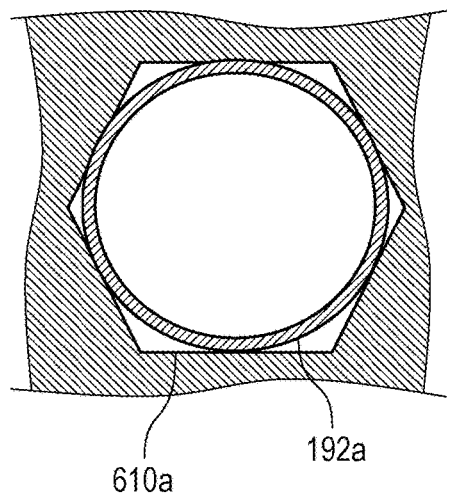
FIG. 7B shows a cross section of a through hole according to another exemplary modification.
Figure 7C:
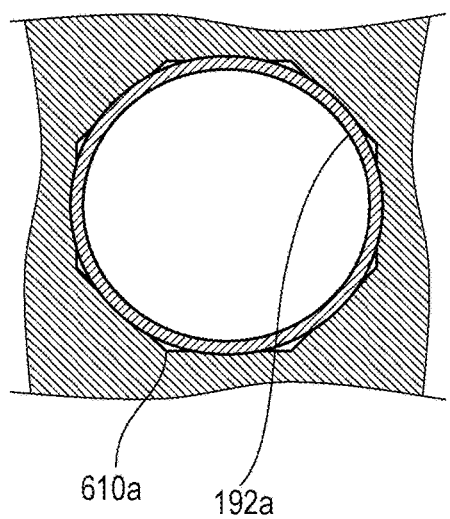
FIG. 7C shows a cross section of a through hole according to still another exemplary modification.
Figure 7D:
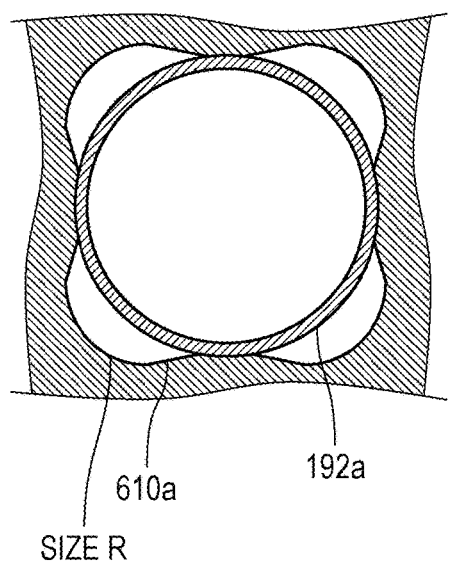
FIG. 7D shows a cross section of a through hole according to still another exemplary modification.

FIG. 7A shows pentagonal internal form 610a of through hole 610. FIG. 7B shows hexagonal internal form 610a of through hole 610. FIG. 7C shows octagonal internal form 610a of through hole 610. FIG. 7D shows rectangular internal form 610a of through hole 610, where four corners are each provided with size R, and, further, a center of each of four sides is curved inward.

In either case, internal form 610a of through hole 610 is partially smaller than external form 192a of annular elastic member 192, and thus through hole 610 comes into pressure contact with external form 192a of annular elastic member 192. Spaces into which annular elastic member 192 can be compressed and deformed are also provided. In either case, size R may be provided at an apex.

Conventional Configuration

A conventional configuration will be described below with reference to FIGS. 8A, 8B.

Figure 8A:
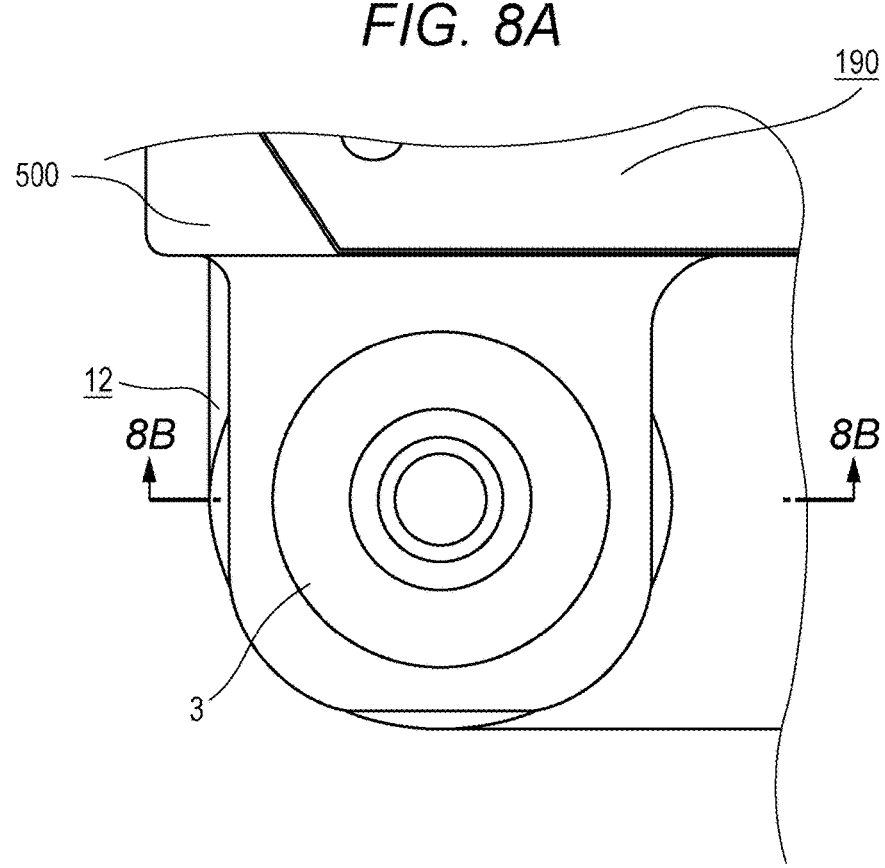
FIG. 8A is an enlarged view of a first holding-frame-side support and a first body-side support according to a conventional configuration, when viewed from rear.
Figure 8B:
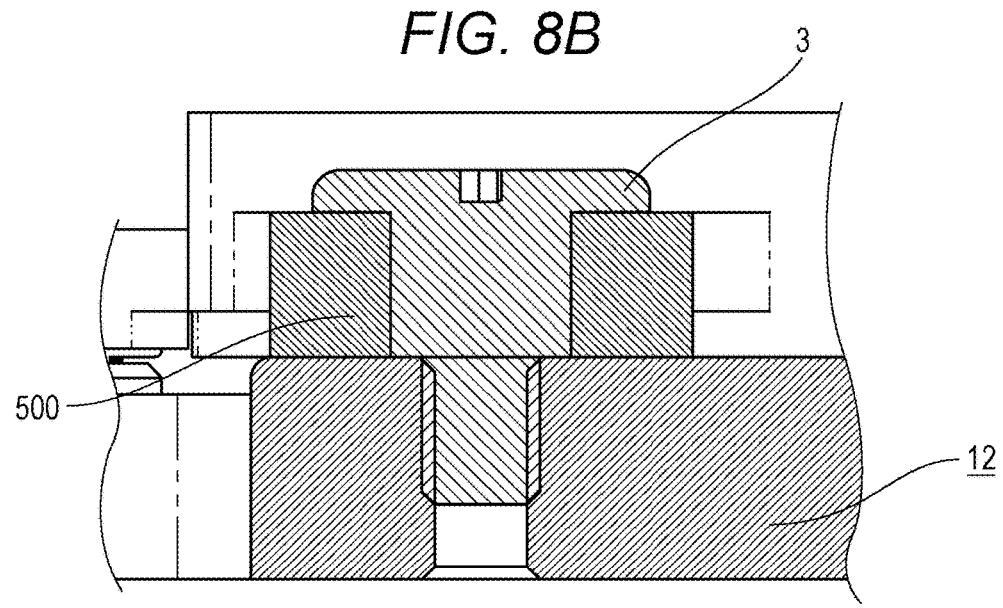
FIG. 8B shows a cross section taken along line 8B-8B of FIG. 8A.

FIG. 8A is an enlarged view of a first holding-frame-side support and a first body-side support according to the conventional configuration, when viewed from rear. FIG. 8B shows a cross section taken along line 8B-8B of FIG. 8A.

Holding frame 500 of shutter unit 590 is directly fastened with screws 3 to chassis 512. Shutter unit 190 can therefore securely be fixed to chassis 12. However, a drive force of a shutter mechanism and an impact force when the shutter mechanism is stopped are directly transmitted to a sensor unit, and such a force could negatively affect a captured image such as a blurred image (so-called a shutter shock).

OTHER EXEMPLARY EMBODIMENTS

The first exemplary embodiment has been described above as an exemplary technology disclosed in this application. However, the technology according to the present disclosure is not limited to the above described first exemplary embodiment, but is applicable to exemplary embodiments where alteration, replacement, addition, omission, and the like have been implemented. A new exemplary embodiment can also be created by combining components of the first exemplary embodiment described above.

Other exemplary embodiments will be described below.

In the above exemplary embodiment, supporting of shutter unit 190 with through hole 610 formed on first holding-frame-side support 510 and annular elastic member 192 has been described. Through hole 610 may be formed on to, instead of holding frame 500, as shown in FIG. 5C, first body-side support 710 of chassis 12. Through hole 610 may be formed on either of first holding-frame-side support 510 and first body-side support 710.

In the above exemplary embodiment, supporting of shutter unit 190 with long hole 620 formed on second holding-frame-side support 520 has been described. Long hole 620 may be formed on to, instead of holding frame 500, second body-side support 720 of chassis 12. Long hole 620 may be formed on either of second holding-frame-side support 520 and second body-side support 720.

In the above exemplary embodiment, rectangular through hole 610 shown in FIGS. 5A and 5B has been described as an example of through hole 610. A shape of through hole 610 may be one of the shapes shown in FIGS. 7A to 7D. As shown in FIG. 5A, FIGS. 7A to 7D, a length of an inner circumference of the through hole 610 may be greater than a length of an outer circumference of the annular elastic member 192 when the through hole 610 is seen from a direction to which the first fastening member 810 is fastened, Therefore, a through hole may be formed on either of first body-side support 710 and first holding-frame-side support 510, may come into pressure-contact with the outer circumferential surface of annular elastic member 192, and may have spaces (spaces are formed by difference between a length of an inner circumference of the through hole 610 and a length of an outer circumference of the annular elastic member 192 when the through hole 610 is seen from a direction to which the first fastening member 810 is fastened) into which, when the shutter is driven, and impact is generated, annular elastic member 192 can be compressed and deformed. A shape of through hole 610 is not therefore limited to a rectangular shape. Among the four corners, at least a corner may be pointed.

The above described exemplary embodiments are merely examples for illustrating the technology according to the present disclosure, and thus alteration, replacement, addition, omission, and the like can variously be implemented within the scope of the present disclosure defined by the appended claims and their equivalents.

The present disclosure is applicable to imaging apparatuses equipped with a shutter. Specifically, the present disclosure is applicable to still cameras, digital still cameras, compact digital cameras, movie cameras, cellular phones with a camera function, smartphones, and the like.

What is claimed is:

1. An imaging apparatus comprising:
    a shutter for controlling object light incident to an image sensor for capturing an optical image of an object to generate image data;
    a holding frame holding the shutter;
    an annular elastic member for absorbing impact generated when the shutter is driven;
    a first fastening member engaging with an inner circumferential surface of the annular elastic member;
    a first body-side support provided to a body of the imaging apparatus; and
    a first holding-frame-side support provided to the holding frame,
    wherein on either of the first body-side support and the first holding-frame-side support, a through hole is formed, into which the annular elastic member is press-fitted,
    a length of an inner circumference of the through hole is greater than a length of an outer circumference of the annular elastic member when the through hole is seen from a direction to which the first fastening member is fastened, and another of the first body-side support and the first holding-frame-side support is fastened with the first fastening member.

2. The imaging apparatus according to claim 1, wherein spaces are formed by difference between a length of an inner circumference of the through hole and a length of an outer circumference of the annular elastic member when the through hole is seen from a direction to which the first fastening member is fastened, and when the impact is generated, and the annular elastic member is compressed and deformed, the annular elastic member enters the spaces.

3. The imaging apparatus according to claim 1, further comprising:
　a second fastening member;
　a second body-side support provided to the body of the imaging apparatus; and
　a second holding-frame-side support provided to the holding frame,
　wherein either of the second body-side support and the second holding-frame-side support has a long hole formed to have spaces in directions toward which the shutter opens and closes, and
　another of the second body-side support and the second holding-frame-side support is fastened with the second fastening member so that the holding frame is slidable within the long hole.

4. The imaging apparatus according to claim 1, further comprising a body mount for detachably holding a lens unit having an optical system for generating an optical image of an object.

5. The imaging apparatus according to claim 1, wherein the through hole has a rectangular shape,
　an inner circumferential surface of the through hole is formed of four planes each come into pressure-contact with an outer circumferential surface of the annular elastic member, and
　the spaces are formed of four corners of the through hole.

6. The imaging apparatus according to claim 5, wherein, at each of the four corners of the through hole, size R smaller than a half of an outer diameter of the annular elastic member is formed.

* * * * *